Aug. 27, 1963

W. S. HAMMOND ETAL 3,101,689

WIRE SOLDER DISPENSING DEVICE

Filed Oct. 17, 1961

INVENTORS
WAYNE S. HAMMOND
DELBERT H. DEFRIES
RONALD E. KENYON

WITNESS
NORMAN G. TRAVISS

BY Talbert Dick & Zarley
ATTORNEYS 3,101,689
WIRE SOLDER DISPENSING DEVICE
Wayne S. Hammond, Delbert H. Defries, and Ronald E. Kenyon, all of Heron Lake, Minn.
Filed Oct. 17, 1961, Ser. No. 145,570
8 Claims. (Cl. 113—94)

Our device relates to dispensing tools and more particularly to a device that will conveniently dispense wire solder from a reel unit.

One of the problems of utilizing wire solder is the inconvenience of unrolling the solder from the conventional reel during the soldering operation.

Therefore, the principal object of our invention is to provide a wire solder dispensing device that can accommodate a reel of wire solder and dispense it in uniform increments.

A further object of our invention is to provide a wire solder dispensing device that can be easily operated with one hand.

A still further object of our invention is to provide a wire solder dispensing device that will prevent the solder from melting prematurely.

A still further object of our invention is to provide a wire solder dispensing device that will dispense the wire solder without entangling the solder as it comes from the reel.

A still further object of our invention is to provide a wire solder dispensing device that can dispense solder as rapidly as the operator can manually actuate the co-acting elements.

A still further object of our invention is to provide a wire solder dispensing device that is economical of manufacture, durable in use, and refined in appearance.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

Figure 2:
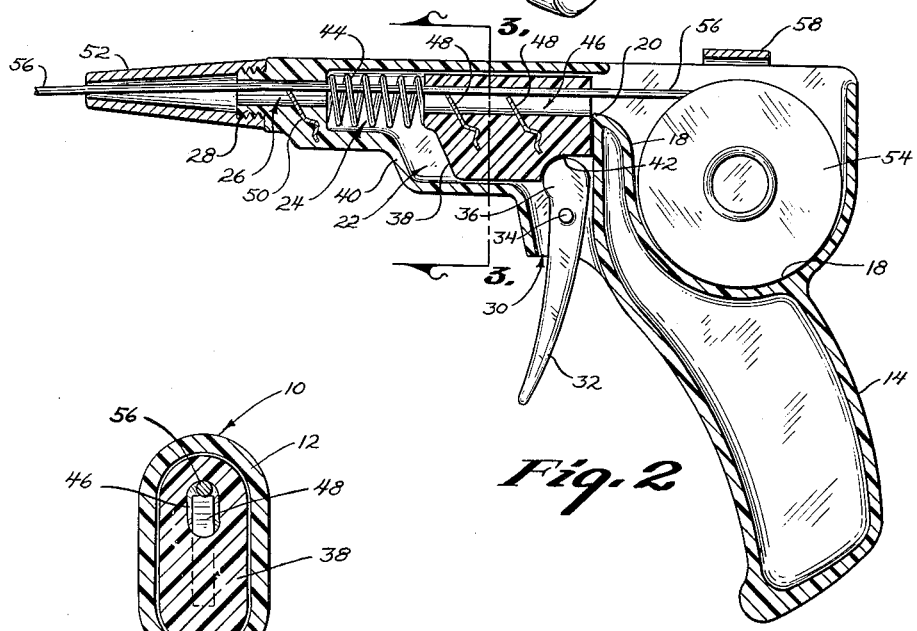
FIG. 2 is a longitudinal sectional view of our device illustrating the construction thereof.

We have used the numeral 10 to generally designate the housing for our device which is comprised primarily of a horizontal barrel portion 12 and a downwardly extending handle portion 14. A cylindrical compartment 16 is located rearwardly of barrel portion 12 and above handle portion 14 in the housing 10. This cylindrical compartment 16 is created by the arcuate wall 18 which, as shown in FIG. 2, has its forward edge 20 terminating at a level just below the top surface of the horizontal barrel portion 12.

The horizontal barrel portion 12 is generally hollow and has an oval-shaped compartment 22 located just forwardly of the cylindrical compartment 16. As shown in FIG. 2, the compartments 22 and 16 are in communication with each other by virtue of the forward edge 20 of arcuate wall 18 terminating at a point below the upper surface of the horizontal barrel portion. The forward end of oval-shaped compartment 22 terminates in a cylindrical bore 24 which in turn terminates in an oval-shaped bore 26. A hollow shoulder 28 is located on the forward end of horizontal barrel portion 12 and shoulder 28 is threaded on its outer surface. It will be noted that the hollow opening in shoulder 28 is in communication with the oval-shaped bore 26 which in turn is in communication with the bore 24. The oval-shaped bore 26 is smaller in cross-sectional area than the circular bore 24.

Figure 1:
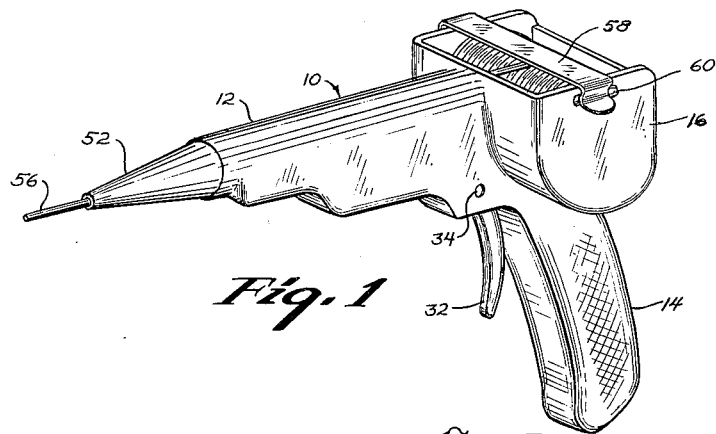
FIG. 1 is a perspective view of our device.

An access opening 30 is located in the bottom of horizontal barrel portion 12 and is in communication with the compartment 22. A trigger 32 is pivotally mounted within access opening 30 by means of pin 34 which is mounted in housing 10 in a horizontal position. Trigger 32 has a cam surface 36 on its upper end which penetrates into the lower portion of compartment 22. As shown in FIGS. 1 and 2, the lower end of trigger 32 extends downwardly and outwardly from the access opening 30.

Figure 3:
FIG. 3 is a sectional view through our device taken on line 3—3 of FIG. 2.

A slide element 38 is movably mounted within compartment 22. Slide element 38 has a constant cross section for some distance along its length which coincides with the inner cross-sectional area of compartment 22. The oval-shaped cross section of slide element 38, as illustrated in FIG. 3, is slidably supported within the oval-shaped cross-sectional interior of compartment 22. Obviously, the cross-sectional shape of slide element 38 could be varied with that of the compartment 22 with the only important consideration being that the compartment support in a stabilized manner the slide element for sliding movement in a forward or rearward direction. The forward sliding movement of slide element 38 is limited by the shoulder 40 and the rearward sliding movement of this element is limited by the forward edge 20 of arcuate wall 18. An arcuate notch 42 is located at the lower rear portion of slide element 38 and this notch 42 receives the cam surface 36 on the upper end of trigger 32. Thus, a rearward pressure on the lower end of trigger 32 will cause the cam surface 36 to pivot forwardly against the arcuate notch 42 to cause the slide element 38 to move forwardly within compartment 22. A spring 44 which is normally in expanded condition is mounted and supported within the bore 24 and is in constant engagement with the forward end of slide element 38 to yieldably force the slide element rearwardly against the forward edge 20 of arcuate wall 18. The pivoting of trigger 32 in the manner described above permits the slide element 38 to compress the spring 44 as the slide element moves forwardly in compartment 22. When this pivoting pressure of trigger 32 is released from the arcuate notch 42 of slide element 38, the spring 44 is then free to expand and forces the slide element rearwardly in compartment 22 to a position against the forward edge 20 of arcuate wall 18.

An elongated oval-shaped bore 46 extends in a horizontal direction through slide element 38 in substantial alignment with the oval-shaped bore 26 in the forward end of the barrel portion 12. The bores 26 and 46 are of substantially the same cross-sectional area. As shown in FIG. 2, the bore 46 in slide element 38 is in communication with the cylindrical compartment 16 at the rear of housing 10. Spring pawls 48 are embedded in the lower portion of slide element 38 and extend upwardly and forwardly into the bore 46, as shown in FIG. 2. The pawls 48 terminate slightly below the top surface of the bore 46 to permit a length of wire solder to pass in one direction through the bore above the upper ends of the pawls. The forwardly inclined position of the pawls 48 in the bore 46 permits the slide element to move rearwardly relative to a stationary length of wire solder but will cause a length of wire solder to move forwardly with the slide element when the slide element is moved forwardly within the compartment 22. A pawl 50 identical to the pawls 48 is embedded in the lower forward portion of barrel portion 12 and extends into the bore 26 in the very same manner that the pawls 48 protruded into the bore 46 of slide element 38.

A hollow conically shaped tip portion is threadably mounted on the shoulder 40 of barrel portion 12. Whereas housing 10 can be comprised of plastic or the like, tip portion 52 should be comprised of a heat resistant material such as asbestos or certain types of heat resistant plastic.

A conventional spool 54 with wire solder 56 wound thereabout is mounted in the cylindrical compartment 16. A resilient clip 58 is detachably mounted in notches 60 on the sides of the cylindrical compartment 16. The clip 58 extends across the top of the compartment to prevent the inadvertent removal of the spool 54 therefrom. The clip 58 can be detached from the position shown in FIG. 1 by disengaging one of its ends from one of the notches 60.

The normal operation of our device is as follows: The spool 54 with wire solder 56 wound thereon can be inserted into cylindrical compartment 16 by removing clip 58 in the manner described. The clip 58 can then be inserted to its operative position to prevent the inadvertent removal of the spool from the compartment. The free end of the wire solder 56 can then be threaded forwardly into the bore 46 of slide element 38, thence through spring 44 in bore 24 and thence forwardly through bore 26. When the lower end of trigger 32 is pulled rearwardly toward handle portion 14 the slide element 38 is moved forwardly in compartment 22 in the manner described and spring 44 is compressed. The spring pawls 48 bite into the wire solder 56 and bind the wire solder against the top of the bore 46 as the slide element 38 moves forwardly in compartment 22. The momentary rigid connection between the slide element 38 and the wire solder 56 causes the length of wire solder to move forwardly through the barrel portion 12 into the tip portion 52. The pawl 50 yields to this forward movement of the wire solder 56 through the bore 26. When the slide element 38 engages the shoulder 40 of barrel portion 12, the trigger 32 is released and the spring 44 thereupon forces the slide element rearwardly in the compartment 22 back against the forward edge 20 of arcuate wall 18. The pawls 48 disengage the wire solder 56 when the slide element 38 returns to its initial position and the pawl 50 thereupon engages the wire solder to prevent any rearward movement of the wire solder in a rearward direction. The above described cycle is then repeated until the forward end of the wire solder protrudes from the extreme forward end of tip portion 52. As the operator continues to actuate the trigger 32 in the manner described, the wire solder 56 will be fed outwardly from the forward end of tip portion 52 in increments equal to the forward displacement of slide element 38.

Thus, it is seen from the foregoing description that our device will accomplish at least all of its stated objectives.

Some changes may be made in the construction and arrangement of our wire solder dispensing device without departing from the real spirit and purpose of our invention, and it is our intention to cover by our claims, any modified forms of structure or use of mechanical equivalents which may be reasonably included within their scope.

We claim:
1. In a wire dispensing device,
an elongated housing having two side walls, a bottom wall and a top wall,
a body portion integral with said housing positioned at one end and extending transversely thereof beyond the sides of said housing,
said body portion having a compartment formed therein extending between opposite ends thereof,
said housing having a longitudinal opening formed therein extending from the other end thereof into said compartment,
a roll of wire adapted to be held in said compartment,
said compartment having a depth such that the top side of said compartment is in substantially the same plane as the top side of said housing,
a handle integral with said housing and said body portion; said handle having a top side also forming the bottom of said compartment, said handle and said housing being in a common plane, said handle extending downwardly from said body portion intermediate its ends,
said opening in said housing being enlarged at its end adjacent said body portion,
a slide element movably positioned in said enlarged opening and having a longitudinal opening formed therein in alignment with said opening in the end of said housing opposite said body portion, said wire adapted to be unrolled through said opening in said slide element and through said opening in said housing,
said slide element comprising top, bottom, front and rear sides, wire engaging means positioned in said opening in said slide element,
said housing having an access opening formed in the bottom side wall adjacent said handle and said body portion and extending into said enlarged opening,
an elongated trigger element positioned in said access opening and pivotally connected to said housing side walls, a lower end portion of said trigger element extending below said housing,
a spring means in said enlarged opening having one end in yieldable engagement with said front side of said slide element and the other end in engagement with the forward wall of said enlarged opening remote from said body portion, the rear side of said slide element held in yieldable engagement with the rearward wall of said enlarged opening adjacent said body portion,
said bottom side of said slide element in slidable contact with the bottom side of said enlarged opening, said top side of said slide element in slidable contact with the top side of said enlarged opening,
said rear side of said slide element having formed therein a shoulder parallel and adjacent to the bottom side of said slide element, said shoulder merging into a rounded shoulder terminating at the bottom side of said slide element, and
said trigger element having a rounded upper end portion adapted to engage said rounded shoulder on said slide element, said lower end portion of said trigger element adapted to be moved toward said handle causing said slide element to move forwardly whereby said wire will be advanced.

2. The structure of claim 1 and means in said opening in said housing for gripping said wire as said wire is advanced through said housing.

3. The structure of claim 2 and closure means mounted on the top side of said compartment in said body portion and adapted to retain a roll of wire in said compartment.

4. The structure of claim 1 wherein said wire adapted to be used in said device is comprised of solder.

5. The structure of claim 4, and a hollow tip secured to the forward end of said housing remote from said body portion, said hollow tip being in alignment with said opening in said housing and said tip being comprised of a heat resistant material.

6. The structure of claim 1 wherein said spring means is in the form of a coil spring and said wire is adapted to be extended longitudinally through said coil spring.

7. In a solder dispenser,
an elongated housing, said housing having a top, bottom, front and rear walls forming an enlarged opening therein, said bottom wall having a first portion thereof parallel to said top wall, said first portion terminating at one end thereof in a shoulder portion extending toward said top housing wall, said shoulder terminating at its upper end in a second bottom wall portion parallel to said top wall, said second bottom wall portion terminating at said end wall of said housing, the other end of said first portion of said bottom wall terminating in a downwardly extending trigger casing, said trigger casing having an access opening communicating with said enlarged opening, said casing having two side walls and a forward wall integral with said first bottom wall portion and a rear wall integral with said rear wall of said housing, said front and rear walls of said housing having aligned openings formed therein, a slide element movably positioned in said enlarged opening, said slide element having a front, rear, bottom and two side walls, said top wall in slidable engagement with said top wall of said housing, said rear wall adapted to engage said rear wall of said housing, said two side walls adapted to slidably engage said side walls of said housing, said front wall of said slide element having a first shoulder portion extending adjacent and perpendicular to said top wall of said housing terminating in a second shoulder adapted to engage said shoulder portion in said bottom housing wall to limit the forward travel of said slide element, said slide element having a longitudinal opening formed therein in alignment with said openings in said front and rear housing walls, a coil spring means positioned between the first shoulder on said front wall of said slide element and the front wall of said housing, said spring means adapted to slidably engage the housing side walls and the second bottom wall portion, said bottom wall of said slide element having a forward portion adapted to slidably engage said first portion of said housing bottom wall, said first portion terminating in a concave shoulder adjacent said rear wall of said slide element, said concave shoulder terminating in a second shoulder parallel to said top side wall of said slide element, said second shoulder terminating at the rear wall of said slide element, a trigger element pivotally mounted in said trigger casing, said trigger element having a rounded upper end portion adapted to engage said concave shoulder in said slide element, said trigger element having a lower end portion extending outside the trigger casing, said trigger element adapted to move said slide element forwardly against the spring action of said coil spring, and a yieldable wire gripping means positioned in said longitudinal opening in said slide element.

8. The structure of claim 7 wherein a length of wire solder is adapted to be extended through said opening in said rear wall of said housing, said longitudinal opening in said slide element and said front wall of said housing; said yieldable wire gripping means adapted to yieldably engage said wire solder and move it forwardly as the slide element is moved forwardly.

References Cited in the file of this patent

UNITED STATES PATENTS

| | | |
|---|---|---|
| 2,142,340 | Williams | Jan. 3, 1939 |
| 2,604,064 | Sefton | July 22, 1952 |
| 2,604,571 | Naulty et al. | July 22, 1952 |
| 2,810,168 | Nyborg | Oct. 22, 1957 |
| 2,821,947 | Von Knauf | Feb. 4, 1958 |
| 2,833,904 | Cunningham | May 6, 1958 |
| 2,952,232 | Sipala | Sept. 13, 1960 |
| 2,995,099 | Kowalczyk | Aug. 8, 1961 |